United States Patent [19]

Sugiyama et al.

[11] Patent Number: 4,614,979
[45] Date of Patent: Sep. 30, 1986

[54] DIGITAL VIDEO SIGNAL REPRODUCING APPARATUS

[75] Inventors: Hiroyuki Sugiyama, Isehara; Yoshiaki Amano, Fujisawa; Ryozo Abe, Yokohama; Nobuaki Takahashi, Yamato; Takeshi Shibamōto, Sagamihara; Hideo Sato, Yokohama; Koji Tanaka, Tokyo, all of Japan

[73] Assignee: Victor Company of Japan, Ltl., Yokohama, Japan

[21] Appl. No.: 530,033

[22] Filed: Sep. 7, 1983

[30] Foreign Application Priority Data

Sep. 22, 1982 [JP] Japan .................. 57-165605

[51] Int. Cl.⁴ .............................. H04N 5/91
[52] U.S. Cl. ................... 358/335; 360/32; 360/33.1; 360/37.1; 360/10.1
[58] Field of Search ............. 358/335; 360/32, 33.1, 360/37.1, 9.1, 10.1

[56] References Cited

U.S. PATENT DOCUMENTS

| | | | |
|---|---|---|---|
| 3,919,716 | 11/1975 | Yumde | 360/9.1 |
| 4,135,205 | 1/1979 | Takahashi | 360/11.1 |
| 4,463,387 | 7/1984 | Hashimoto | 360/32 |
| 4,520,401 | 5/1985 | Takahashi | 358/310 |

*Primary Examiner*—Alan Faber
*Attorney, Agent, or Firm*—Ladas & Parry

[57] ABSTRACT

A digital video signal reproducing apparatus comprises a reproducing circuit for reproducing a digital video signal from a recording medium, which digital video signal is added with at least a write-in specifying code and a read-out specifying code for specifying a memory circuit part to picture element data groups which are obtained by subjecting a video signal to a digital pulse modulation, a detecting circuit for detecting the write-in specifying code and the read-out specifying code within a reproduced digital video signal from the reproducing circuit, a generator for generating various synchronizing signals and reference signals, first and second memory circuit parts each having a memory capacity for storing picture element data corresponding to one picture, a write controller for causing the picture element data to be written into one of the first and second memory circuit parts according to a value of the write-in specifying code, a latch circuit for latching the read-out specifying code by a vertical synchronizing signal generated from the generator, a read controller for causing stored picture element data to be successively read out from one of the first and second memory circuit parts according to a value of the read-out specifying code from the latch circuit, and a circuit for converting the picture element data read out from the first and second memory circuit parts to an analog video signal.

3 Claims, 8 Drawing Figures

DIGITAL VIDEO SIGNAL REPRODUCING APPARATUS

BACKGROUND OF THE INVENTION

The present invention generally relates to digital video signal reproducing apparatuses, and more particularly to a reproducing apparatus for reproducing a digital video signal which is related to a plurality of pictures and is time-sequentially recorded on a recording medium.

Generally, there is a known reproducing apparatus which reproduces a digital video signal recorded on tracks formed on a rotary recording medium (hereinafter simply referred to as a disc) as variations in rows of intermittent pits. The digital video signal is obtained by subjecting a video signal to a digital pulse modulation such as a pulse code modulation (PCM). As systems for reproducing the recorded digital video signal from such a disc, there is a system which reproduces the recorded signal in response to variations in the intensity of light reflected from or transmitted through the disc according to the variations in the pits formed on the disc, and a system which reproduces the recorded signal in response to variations in the electrostatic capacitance formed between a reproducing stylus and the disc according to the variations in the pits formed on the disc.

If the conventional digital video signal reproducing apparatus of the above type is a reproducing apparatus for time-sequentially transmitting a plurality of still picture information recorded on the disc, two frame memories are provided in the reproducing apparatus, for example. In such a reproducing apparatus, still picture information related to one or less frames is alternately written into these two frame memories. When one of the frame memories is writing therein a reproduced digital video signal, a reproduced digital video signal is read out from the other frame memory. The signal read out from the frame memory is successively passed through a digital-to-analog converter and an encoder, and then supplied to a television receiver which reproduces the signal as a picture.

The above digital video signal reproducing apparatus further comprises a synchronizing signal generator (SSG) which generates a write-in clock signal and a read-out clock signal for the memory, a horizontal synchronizing signal and a vertical synchronizing signal of a reproduced video signal which is in conformance with a standard television system and is produced from the encoder, and other various signals required upon reproduction. The disc is rotated in phase with the horizontal synchronizing signal obtained from this SSG. Among the plurality of still picture information time-sequentially recorded on the disc, a picture switching code for switching the memory from which the read-out is to be carried out from one of the two memories to the other, is recorded between adjacent still prcture information.

However, the digital video signal and the picture switching code which are reproduced from the disc, are not in phase with the vertical synchronizing signal obtained from the SSG. Thus, it was possible for the switching point of the picture to appear within the reproduced picture. Accordingly, the quality of the reproduced picture became deteriorated when switching the display of the reproduced picture from one picture to another in the conventional digital video signal reproducing apparatus. In addition, there was a problem in that the brightness appeared to be different in the top and bottom of the reproduced picture according to the pattern of the picture.

SUMMARY OF THE INVENTION

Accordingly, it is a general object of the present invention to provide a novel and useful digital video signal reproducing apparatus in which the above described problems have been eliminated.

Another more specific object of the present invention is to provide a digital video signal reproducing apparatus which is capable of switching the picture which is displayed from one picture to another without introducing deterioration in the picture quality, by switching the picture in phase with the vertical synchronizing signal.

Still another object of the present invention is to provide a digital video signal reproducing apparatus which reproduces signals from a recording medium recorded with a digital video signal which is at least added with a read-out specifying code which specifies a displaying memory circuit part at a signal position corresponding to the picture element data group of each picture information, discriminates and reproduces the read-out specifying code within the reproduced digital video signal to supply this read-out specifying code to a latch circuit, the displaying memory circuit part is specified between two memory circuit parts by an output signal of the latch circuit which is latched by a vertical synchronizing signal obtained from a synchronizing signal generator, and a reproduced picture which is displayed is switched from one picture to another in phase with the vertical synchronizing signal. According to the reproducing apparatus of the present invention, the displaying memory circuit part is specified between the two memory circuit parts by the signal which is obtained by latching the read-out specifying code by the vertical synchronizing signal. Thus, it is possible to switch the reproduced picture which is displayed from one picture to another in phase with the vertical synchronizing signal. As a result, it is possible to prevent a switching point of the reproduced picture from being displayed within the reproduced picture. Further, it is also possible to prevent deterioration in the quality of the reproduced picture when the reproduced picture which is displayed is switched from one picture to another.

Other objects and further features of the present invention will be apparent from the following detailed description when read in conjunction with the accompanying drawings.

DETAILED DESCRIPTION

Figure 1:
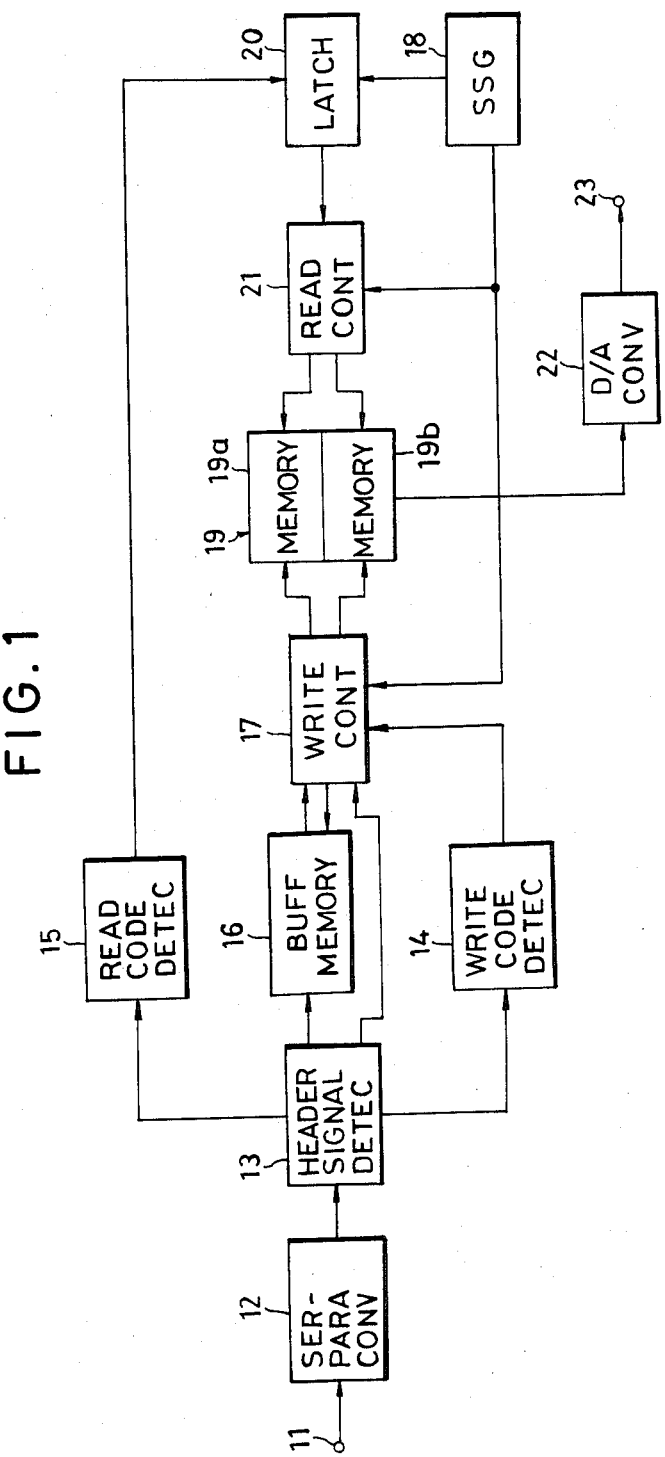
FIG. 1 is a systematic block diagram showing an embodiment of a digital video signal reproducing apparatus according to the present invention.

In the block system shown in FIG. 1, a digital video signal is supplied to a serial-to-parallel converter 12 through an input terminal 11. The digital video signal is a signal which is reproduced from a digital audio disc, for example, by a known means. This digital video signal relates to a color still picture information which is a supplemental information for helping the listener who is listening to the reproduced sounds of a digital audio signal with his imagination. In accordance with a component coding system, the digital video signal is transmitted by a transmission path of one or two channels among transmission paths of a total of four channels, while the digital audio signal transmitted time-sequentially by transmission paths of the remaining three or two channels.

Figure 2:
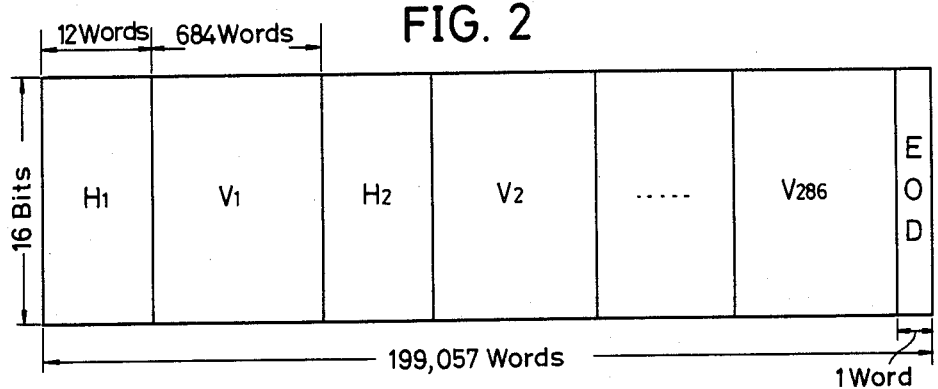
FIG. 2 shows an example of a signal format of a digital video signal which is recorded on a disc and is reproduced by the reproducing apparatus according to the present invention.

The digital video signal has a signal format shown in FIG. 2. This signal format is described in a U.S. Pat. application Ser. No. 485,054 entitled "DIGITAL VIDEO SIGNAL RECORDING SYSTEM AND REPRODUCING APPARATUS" filed Apr. 14, 1983, and now U.S. Pat. No. 4,520,401, for example, in which the assignee is the same as the assignee of the present application. In the input digital video signal, a header part of 12 words and a component coded digital video signal part of 684 words corresponding to 2H, where H indicates one horizontal scanning period, are time-sequentially multiplexed in an alternate manner, for example. Moreover, a signal transmission termination signal (hereinafter also referred to as an end-of-data or EOD signal) of one word is added to the terminal part of the digital video signal. When a video information corresponding to one frame is to be transmitted, the digital video signal of one frame is constituted by 199,057 words as shown in FIG. 2. Such a digital video signal of 199,057 words comprises 286 header parts consisting of header parts $H_1$ through $H_{286}$, 286 video signal parts (divided picture element data groups) consisting of video signal parts $V_1$ through $V_{286}$, and the end-of-data signal of one word indicated by EOD in FIG. 2. In FIG. 2, illustration of the header parts $H_3$ through $H_{286}$ and the video signal parts $V_3$ through $V_{285}$ are omitted.

If it is assumed that one word is transmitted at a frequency which is equal to the sampling frequency of the digital audio signal, the digital video signal of one frame is transmitted in approximately 4.51 seconds when the sampling frequency of the digital audio signal is 44.1 kHz. The digital video signal of one frame is transmitted in approximately 4.21 seconds when the sampling frequency of the digital audio signal is 47.25 kHz.

Figure 3:
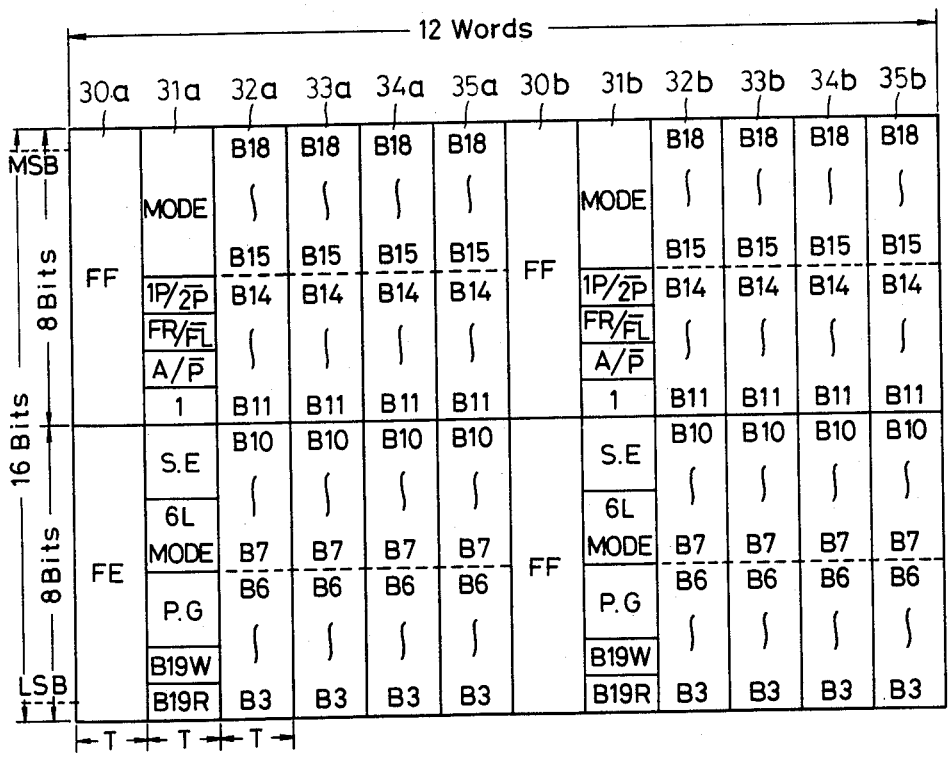
FIG. 3 shows an example of a signal format of a header signal which is recorded on the disc.

An example of a signal format of the header parts $H_1$ through $H_{286}$ is shown in FIG. 3. In FIG. 3, the arrangement of bits is shown along the vertical direction where an uppermost bit in FIG. 3 represents the most significant bit (MSB) and a lowermost bit represents the least significant bit (LSB), and the time is shown along the horizontal direction. T indicates a unit of time corresponding to a reciprocal of the sampling frequency of 44.1 kHz (or 47.25 kHz) and is approximately equal to 22.7 μsec (or 21.2 μsec ). The 16-bit data within this time unit T will hereinafter be referred to as one word.

A synchronizing signal 30a for indicating the beginning of the header signal is arranged at the first word of the header signal. The upper and lower eight bits of the synchronizing signal 30a are respectively selected to values "FF" and "FE" in hexadecimal. Accordingly, if the synchronizing signal 30a is indicated in decimal, all the upper eight bits of the synchronizing signal 30a become "1" while the lower eight bits of the synchronizing signal 30a become "11111110".

The values "FF" and "FE" are only assigned to the upper and lower eight bits of the synchronizing signal 30a within the digital video signal. If the video signal parts $V_1$ through $V_{286}$ assume such values, the values "FF" and "FE" are changed to a value "FD" in the recording system in advance so as to prevent the video signal parts from being erroneously identified as a synchronizing signal. The value "FF" indicates the brightest picture data of the video signal, however, such picture data indicated by the value "FF" and slightly darker picture data indicated by the value "FE" normally do not exist. Therefore, no problems will be introduced by assigning the values "FF" and "FE" to the synchronizing signal 30a.

Various identification codes are transmitted by the second word 31a of the header signal subsequent to the synchronizing signal 30a. A picture mode identification code "MODE" is arranged at the upper four bits of the second word 31a. This picture mode identification code indicates whether the digital video signal to be recorded relates to a standard still picture, a moving picture according to the run-length code, or a high definition still picture, for example. A transmission channel identification code "1P/2$\overline{P}$38 is arranged at the fifth bit of the upper eight bits of the second word 31a. This transmission code identification code "1P/2$\overline{P}$38 indicates which channel or channels among the four transmission channels which will be described hereinafter are used to transmit the digital video signal. When the value of the code "1P/2$\overline{P}$38 is "1", it is identified that the transmission mode is 1P, that is, the fourth channel is used to transmit the digital video signal. In the present embodiment, description is given for the case where the digital video signal is transmitted by use of this fourth channel. On the other hand, when the value of the code "1P/2$\overline{P}$38 is "0", it is identified that the transmission mode is 2P, that is, the fourth channel and the third channel are used to transmit the digital video signal.

Next, a picture information quantity identification code "FR/$\overline{FL}$38 is arranged at the sixth bit of the upper eight bits of the second word 31a constituting the header signal shown in FIG.3. This picture information quantity identification code "FR/$\overline{FL}$38 indicates whether the digital video signal to be transmitted corresponds to one frame or one field. It is identified that the digital video signal corresponds to one frame when the value of the code "FR/$\overline{FL}$" is "1", and corresponds to one field when the value of the code "FR/e,ovs/FL/" is "0". Further, a picture transmission identification code "A/$\overline{P}$38 is arranged at the seventh bit of the upper eight bits of the second word 31a. When the value of the picture transmission identification code "A/$\overline{P}$38 is "1", it is identified that the digital video signal to be transmitted relates to a still picture which should be displayed in full on the screen (so-called full-picture transmission). On the other hand, if the value of the code "A/$\overline{P}$38 is "0", it is identified that the digital video signal to be transmitted relates to a picture which should be displayed on a part of the screen by so-called partial rewriting of the digital video signal.

Further, in FIG. 3, the value "1" indicated at the eighth bit of the upper eight bits of the second word 31a, is a value "1" in binary. If all the first seven bits of the upper eight bits of the second word 31a become "0"

and this eighth bit also assumes the value "0", the upper eight bits of the second word in this case may be erroneously detected as the EOD signal shown in FIG.2 because the upper and lower eight bits of the EOD signal are all selected to "0". For this reason, the value "1" is assigned to the eighth bit of the upper eight bits of the second word 31a.

In addition, in FIG.3, a 2-bit special effect code "S.E" is arranged at the first and second bits of the lower eight bits of the second word 31a. This special effect code "S.E" is provided to identify the kind of special effect such as fade-in and change of picture from the top or left of the screen applied with respect to the still picture displayed. A scanning line number converting code "6LMODE" is arranged at the two bits subsequent to the above code "S.E". A picture category identification code "P.G" for identifying the category or sort of program is arranged at the two bits subsequent to the scanning line number converting code "6LMODE".

The scanning line number converting code "6LMODE" is a code indicating one of four kinds of mixing ratios required to convert the digital video signal of the system using 625 scanning lines (625-line system) to the digital video signal of the system using 525 scanning lines (525-line system), by converting picture information of six scanning lines to picture information of five scanning lines.

Furthermore, in FIG. 3, 1-bit codes "B19W" and "B19R" respectively are a write-in specifying code and a read-out specifying code with respect to two memories within the reproducing apparatus which will be described hereinafter. When the two codes "B19W" and "B19R" respectively are "0" (or "1"), the picture element data of the digital video signal is written into a first (or a second) memory within the reproducing apparatus, and the stored data is read out and displayed on the screen. This means that the content of the picture is changed while displaying the picture, and as a result, it is possible to display a moving picture at a part of the still picture being displayed. On the other hand, when the code "B19W" is "0" and the code "B19R" is "1", the picture element data read out from the second memory is displayed while the picture element data is written into the first memory. In this case, the display on the screen is changed to the display of the picture element data read out from the first memory from the display of the picture element data read out from the second memory according to the EOD signal, after the write-in with respect to the first memory is completed. On the other hand, when the code "B19W" is "1" and the code "B19R" is "0", the picture element data read out from the first memory is displayed while the picture element data is written into the second memory.

The address signals 32a, 33a, 34a, and 35a are respectively indicated by B3 through B18 in FIG. 3, and are arranged at the third through sixth words of the header signal. These address signals 32a, 33a, 34a, and 35a indicate addresses in the memory circuit for storing the two picture element data corresponding to the upper and lower eight bits of each of the words constituting the video signal part which is transmitted in continuous with the header signal. As described before, the television signals used throughout the world either have 625 scanning lines or 525 scanning lines. And, the digital video signal in the present invention is a time-sequentially multiplexed signal of picture element data having 572 scanning lines which actually include the picture information, however, the digital video signal is transmitted under the 625-line system. Accordingly, if reproduction is to be carried out under the 525-line system, the number of scanning lines must be converted within the reproducing apparatus as described above before storing the picture element data into the memory circuit. Thus, the address signals must specify a total of four addresses within the memory circuit for the total of two picture element data corresponding to the upper and lower eight bits of each of the words constituting the video signal part, with respect to the 625-line system and the 525-line system. That is, the address signal 32a indicates the address of the picture element data corresponding to the upper eight bits of the first word constituting the video signal part in the 625-line system, the address signal 33a indicates the address of the picture element data corresponding to the lower eight bits of the first word constituting the video signal part in the 625-line system, the address signal 34a indicates the address of the picture element data corresponding to the first eight bits of the 525-line system obtained by the conversion of the number of scanning lines, and the address signal 35a indicates the address of the picture element data corresponding to the subsequent eight bits of the 525-line system obtained by the conversion of the number of scanning lines.

The seventh through the twelfth words of the header signal shown in FIG. 3 are of a constitution similar to that of the first through sixth words of the header signal described heretofore. The only difference here is that both the upper and lower eight bits of the synchronizing signal 30b corresponding to the seventh word of the header signal, indicate the value "FF". The contents of the various codes in the eighth word 31b and the address signals 32b, 33b, 34b, and 35b, are respectively selected to be the same as the contents of the various codes in the second word 31a and the address signals 32a, 33a, 34a, and 35a.

The header signal may be transmitted once instead of twice, and in such a case, the header signal is constituted by six bits. In addition, the upper eight bits of the address signals 32a through 35a (32b through 35b) may be assigned for the 625-line system (or 525-line system), and the lower eight bits to the 525-line system (or 625-line system).

Figure 4:
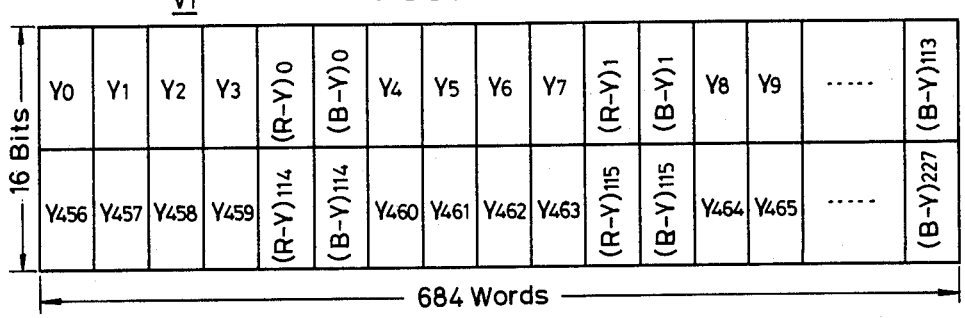
FIG. 4 shows an example of a signal format of one divided picture element data group within the digital video signal shown in FIG. 3.

Next, description will be given with respect to the signal format of the video signal parts (divided picture element data groups) $V_1$ through $V_{286}$ shown in FIG. 2. FIG. 4 shows an example of the signal format of the video signal part $V_1$. In FIG. 4, the bit arrangement is shown along the vertical direction with the uppermost bit indicating the MSB and the lowermost bit indicating the LSB, and the time is shown along the horizontal direction, as in FIGS. 2 and 3. Each of the 286 video signals parts $V_1$ through $V_{286}$ are respectively constituted by 684 words as described before, and each of the video signal parts are transmitted with the picture element data of one scanning line between adjacent scanning lines arranged at the upper eight bits and the picture element data of the other scanning line arranged at the lower eight bits. Accordingly, the signal format of the first video signal part $V_1$ becomes as shown in FIG. 4 wherein a digital video signal series of each of the sampling points in the first scanning line (the first 1H of the first field) positioned at the uppermost part of the picture, is arranged at the upper eight bits of each of the words constituting the video signal part $V_1$. That is, among the plurality of picture elements arranged in a matrix form and constituting one picture, the picture element data from the first row of picture element groups are arranged at the upper eight bits of each of the words constituting the video signal part $V_1$. On the other hand, a digital video signal series of each of the sampling points in the second scanning line (the first 1H of the second field) positioned next to the uppermost part of the picture, is arranged at the lower eight bits of each of the words constituting the video signal part $V_1$. That is, among the plurality of picture elements arranged in the matrix form and constituting one picture, the picture element data from the second row of picture element data groups are arranged at the lower eight bits of each of the words constituting the video signal part $V_1$.

Further, in FIG. 4, $Y_0$ through $Y_{455}$ ($Y_{10}$ through $Y_{455}$ are not shown) indicate positions of each of the picture element data from the first sampling point to the 456-th sampling point of the digital luminance signal in the first scanning line, and $Y_{456}$ through $Y_{911}$ ($Y_{466}$ through $Y_{911}$ are not shown) indicate positions of each of the picture element data from the first sampling point to the 456-th sampling point of the digital luminance signal in the second scanning line. In addition, $(R-Y)_0$ through $(R-Y)_{113}$ and $(B-Y)_0$ through $(B-Y)_{113}$ ($(R-Y)_2$ through $(R-Y)_{113}$ and $(B-Y)_2$ through $(B-Y)_{112}$ are not shown) respectively indicate positions of each of the picture element data from the first sampling point to the 114-th sampling point of the digital color difference signals $(R-Y)$ and $(B-Y)$ in the first scanning line. $(R-Y)_{114}$ through $(R-Y)_{227}$ and $(B-Y)_{114}$ through $(B-Y)_{227}$ ($(R-Y)_{116}$ through $(R-Y)_{227}$ and $(B-Y)_{116}$ through $(B-Y)_{226}$ are not shown) respectively indicate positions of each of the picture element data from the first sampling point to the 114-th sampling point of the digital color difference signals $(R-Y)$ and $(B-Y)$ in the second scanning line. Hence, the video signal part $V_1$ comprises picture element data groups corresponding to 2H of the first and second scanning lines. The signal format of the video signal part $V_1$ is such that the picture element data of the four sampling points of the digital luminance signal and the picture element data of one respective sampling point of the two kinds of digital color difference signals, that is, a total of six picture element data are considered as one unit, and the the digital video signal data are transmitted in terms of this unit. The video signal parts $V_2$ through $V_{286}$ have the signal formats similar to that of the video signal part $V_1$. All the sixteen bits of the EOD signal are "0", however, when the all bits of the word constituting the video signal parts $V_1$ through $V_{286}$ assume the value "0", the value of the word is changed to a close value so that the LSB of that word is "1" and the rest of the bits are all "0" in order to prevent that word from being erroneously detected as the EOD signal.

The video signal part may be constituted so that the picture element data groups aligned along the vertical direction are arranged in the upper eight bits of the sixteen bits which form one word, and the picture element data groups aligned along a succeeding row are arranged in the lower eight bits of the one word. In this case, the number of words in each video signal part will obviously become different from the number shown in FIG. 4, and becomes equal to 286 words, for example.

Returning now to FIG. 1, the digital signal having the signal formats shown in FIGS. 2 through 4 is reproduced from the digital audio disc by a known means such as detection of variations in the electrostatic capacitance formed between an electrode of the reproducing stylus and the disc. This reproduced digital video signal is a time-sequential signal serially transmitted from the MSB of each word. The reproduced digital video signal is supplied to the serial-to-parallel converter 12 through the input terminal 11, and is subjected to serial-to-parallel conversion. A signal obtained from the serial-to-parallel converter 12 is a signal in which one word is constituted by sixteen bits, and this output signal of the serial-to-parallel converter 12 is supplied in parallel to a header signal detector 13. When the header signal detector 13 detects the synchronizing signal 30a (or 30b) within the header signal, the header signal detector 13 latches the succeeding 1-word signal 31a (or 31b). The data in the fifteenth bit, that is, the data in the write-in specifying code "B19W", within the 16-bit signal 31a (or 31b) which is latched by the header signal detector 13, is latched by a write-in specifying code detector 14. The data in the sixteenth bit, that is, the data in the read-out specifying code "B19R", within the 16-bit signal 31a (or 31b) which is latched by the header signal detector 13, is latched by a read-out specifying code detector 15. In addition, when the header signal detector 13 detects the synchronizing signal 30a (or 30b), the header signal detector 13 latches a predetermined address signal among the address signals 32a through 35a (or 32b through 35b) which is obtained between the second and fifth words after detection of the synchronizing signal 30a (or 30b).

Furthermore, the picture element data groups obtained twelve words (or six words) after the synchronizing signal 30a (or 30b) is detected by the header signal detector 13, are passed unchanged through the header signal detector 13 and supplied to a buffer memory 16 wherein the picture element data groups are successively stored. In addition, the address signals within the header signal is directly supplied to a write controller 17 from the header signal detector 13. An address latch pulse which is formed in the header signal detector 13 and indicates the change in the write-in address, is also supplied to the buffer memory 16 and stored together with the first eight bits of the picture element data in each divided picture element data group described previously.

A synchronizing signal generator (SSG) 18 generates a timing clock pulse for timing the operation of a digital-to-analog converter which subjects the reproduced digital video signal to a digital-to-analog conversion, horizontal and vertical synchronizing signals and a burst flag pulse which are to be supplied to an encoder (not shown) in order to convert the output signal of the digital-to-analog converter into a video signal which is in conformance with a standard television system (for example, the NTSC system, PAL system, and SECAM system), and various reference pulses required upon reproduction. Among the various output signals of the SSG 18, the pulse which indicates the horizontal blanking period is supplied to the write controller 17 and a read controller 21 which will be described hereinafter.

Accordingly, a number of picture element data transmitted within the horizontal blanking period which is stored in the buffer memory 16, are supplied to and written into a memory circuit part 19a or 19b of a memory circuit 19 under the control of the write controller 17. The picture element data are stored into the memory circuit part 19a or 19b according to the value of the write-in specifying code "B19W" which is supplied to the write controller 17 from the write-in specifying code detector 14. When the value of the write-in specifying code "B19W" is "0", the picture element data are written into the memory circuit part 19a under the control of the write controller 17. On the other hand, when the value of the write-in specifying code "B19W" is "1", the picture element data are written into the memory circuit part 19b under the control of the write controller 17. As a result, the picture element data stored within the buffer memory 16 are supplied to and written into the memory circuit part 19a or 19b according to the value of the write-in specifying code "B19W" during each horizontal blanking period, under the control of the write controller 17. Moreover, the write controller 17 supplies a termination signal to the buffer memory 16 every time the write-in operation within each horizontal blanking period is terminated, so as to shift the stored contents in the buffer memory 16. The stored contents in the buffer memory 16 are shifted, so that the same picture element data stored in the buffer memory 16 is not written into the memory circuit parts 19a and 19b twice.

The memory circuit 19 comprises two memory circuit parts 19a and 19b each having a memory capacity for storing picture element data corresponding to one frame (or one field), as described in the U.S. Pat. application Ser. No. 485,054 described before. For example, the memory circuit 19 is constituted by a 64k random access memory (RAM) and a latching circuit for latching the output of the RAM.

Figure 5:
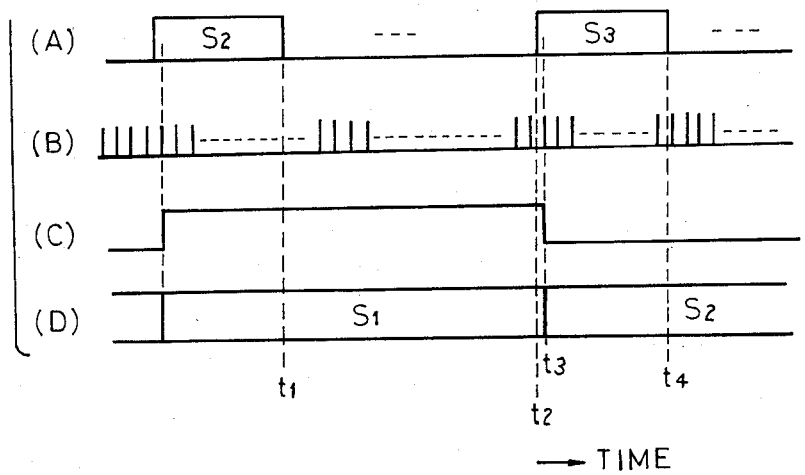
FIGS. 5(A) through 5(D) are graphs respectively showing signal waveforms at each part of the block system shown in FIG. 1.

On the other hand, the data in the read-out specifying code "B19R" which is obtained in the read-out specifying code detector 15, is supplied to a latch circuit 20. The data in the read-out specifying code "B19R" is latched in the latch circuit 20 by a latch pulse. This latch pulse is the vertical synchronizing signal which is generated by the SSG 18 to be supplied to the encoder (not shown) and the like. Accordingly, the latch circuit 20 supplies the data in the read-out specifying code "B19R" to the memory read controller 21 as shown in FIG. 5(C), in phase with the vertical synchronizing signal shown in FIG. 5(B). When the value of the read-out specifying code "B19R" is "0", the picture element data corresponding to one horizontal scanning line are successively read out from the memory circuit part 19a during an interval excluding the horizontal blanking period, that is, for every video interval, under the control of the memory read controller 21. On the other hand, when the value of the read-out specifying code "B19R" is "1", the picture element data corresponding to one horizontal scanning line are successively read out from the memory circuit part 19b during every video interval, under the control of the memory read controller 21.

The picture element data read out from one of the memory circuit parts 19a and 19b, are supplied to a digital-to-analog (D/A) converter 22. The picture element data are converted into an analog signal in the D/A converter 22, and is supplied to the encoder (not shown) through an output terminal 23, together with the various synchronizing signals generated by the SSG 18. An analog video signal which is in conformance with a standard television system, is thus produced from the encoder. This analog video signal is supplied to a monitoring display device and displayed as a still picture.

Next, suppose that a digital video signal related to still pictures $S_1, S_2, S_3, \ldots$ is time-sequentially recorded on the disc which is to be reproduced, for example. In this case, the digital video signal is reproduced in this sequence of the still pictures $S_1, S_2, S_3, \ldots$ as shown in FIG. 5(A). However, the illustration of the reproducing interval of the digital video signal related to the still picture $S_1$ is omitted in FIG. 5(A).

Accordingly, as the reproduction of the picture element data related to the still picture $S_3$ begins at a time t2 which is after a time t1 when the write-in of the picture element data related to the preceding still picture $S_2$ into the memory circuit part 19a is completed, for example, the value of the read-out specifying code "B19R" from the latch circuit 20 changes to "0" at a time t3 in phase with the vertical synchronizing signal shown in FIG. 5(B). This time t3 is immediately after the time t2 and is the time when the vertical synchronizing signal is generated, as shown in FIG. 5(C). Hence, the read-out of the picture element data related to the still picture $S_2$ which is written into the memory circuit part 19a, begins from the time t3.

Therefore, the still picture which is displayed switches to the still picture $S_2$ after the time t3, according to the value of the read-out specifying code "B19R", as shown in FIG. 5(D). The switching of the picture at this time t3 is in phase with the vertical synchronizing signal. Thus, the still picture obtained after the switching of the picture and the still picture obtained before the switching will not be displayed on the top and bottom of the picture, and it is possible to prevent the quality of the reproduced picture from becoming deteriorated. As clearly seen from FIGS. 5(C) and 5(D), the picture which is reproduced at the time t1 is the still picture $S_1$ which is read out from the memory circuit part 19b. In addition, the write-in of the picture element data group related to the still picture $S_3$ is terminated at a time t4.

The present invention is not limited to the embodiment described heretofore, and various modifications may be devised for the signal format of the digital video signal (picture element data groups and the header signal). However, it is essential that at least the read-out specifying code is arranged at the beginning of the picture element data groups related to each picture information. In addition, in the embodiment described before, the switching point of the picture is the beginning of the picture element data group related to the picture information which is subsequently reproduced. However, the switching point of the picture is not limited to this switching position. For example, a signal comprising the header signal and the EOD signal may be recorded at an arbitrary position within a non-transmitting interval in which the picture element data groups related to the picture information are not transmitted. In FIG. 5(A), this non-transmitting interval is an interval from the time t1 to a time immediately preceding the time t2, for example. In this case, when the signal comprising the header signal and the EOD signal recorded at the arbitrary position is reproduced, it is possible to switch the picture from the display of the still picture $S_1$ to the display of the still picture $S_2$ at an arbitrary point before the picture element data groups related to the still picture $S_3$ are reproduced. That is, there is no need to wait until the picture element data groups related to the still picture $S_3$ are reproduced, in order to switch the picture. In this case, measures must be taken so that the memory controller 17 disables the write-in to the memory circuit part 19a or 19b which is specified by the write-in specifying code "B19W", when the reproducing apparatus detects the EOD signal subsequent to the header signal. By designing the reproducing apparatus by taking such measures, it is possible to prevent write-in within the non-transmitting interval of the picture element data groups. When the reproducing apparatus detects the EOD signal subsequent to the header signal, the read-out of the picture element data is only carried out from the memory circuit part 19a or 19b which is specified by the read-out specifying code "B19R".

Further, the present invention is not limited to these embodiments, but various variations and modifications may be made without departing from the scope of the present invention.

What is claimed is:

1. A digital video signal reproducing apparatus for reproducing a digital video signal from a recording medium, said digital video signal having a signal format in which picture element data groups corresponding to one picture are time-sequentially multiplexed together with at least one write-in specifying code, at least one read-out specifying code and one end-of-data signal which is added to an end part of said picture element data groups corresponding one picture, said picture element data groups being obtained by subjecting a video signal to a digital pulse modulation, said digital video signal reproducing apparatus comprising:

reproducing means for reproducing said digital video signal from said recording medium, a first detecting circuit for detecting said write-in specifying code within the digital video signal reproduced by said reproducing means;

a second detecting circuit for detecting said read-out specifying code within the reproduced digital video signal from said reproducing means;

a synchronizing signal generator for generating a first signal indicating a horizontal blanking period, a vertical synchronizing signal and a second signal indicating a video interval;

first and second memroy circuit parts each having a memory capacity for storing the picture element data groups corresponding to one picture;

a write controller supplied with the write-in specifying code from said first detecting circuit, said first signal and the picture element data groups within said reproduced digital video signal, for causing said picture element data groups to be written into one of said first and second memory circuit parts depending on a value of said write-in specifying code for every said horizontal blanking period, said write controller disabling write-in to said first and second memory circuit parts when said end-of-data signal is reproduced subsequent to said write-in specifying code and said read-out specifying code;

a latch circuit supplied with the read-out specifying code from said second detecting circuit, for latching said read-out specifying code when the vertical synchronizing signal is generated by said synchronizing signal generator immediately after said read-out specifying code is detected by said second detecting circuit and before said end-of-data is reproduced;

a read controller supplied with the read-out specifying code from said latch circuit and said second signal, for causing stored picture element data to be successively read out from one of said first and second memory circuit parts depending on a value of said read-out specifying code for every said video interval; and a converting circuit for converting the picture element data groups read out from said first and second memory circuit parts into an analog video signal.

2. A digital video signal reproducing apparatus as claimed in claim 1 in which said first detecting circuit detects and latches said write-in specifying code among said write-in specifying code and said read-out specifying code supplied thereto for every unit comprising a predetermined number of picture element data, and said second detecting circuit detects and latches said read-out specifying code.

3. A digital video signal reproducing apparatus as claimed in claim 1 which further comprises a buffer memory for storing picture element data which are transmitted within the horizontal blanking period among the picture element data within the reproduced digital video signal from said reproducing means, and said write controller supplies the picture element data from said buffer memory to said first and second memory circuit parts.

* * * * *